Feb. 28, 1933.                J. H. FEDELER                1,899,498
                                SEPARATOR
                            Filed Dec. 4, 1928          2 Sheets-Sheet 1
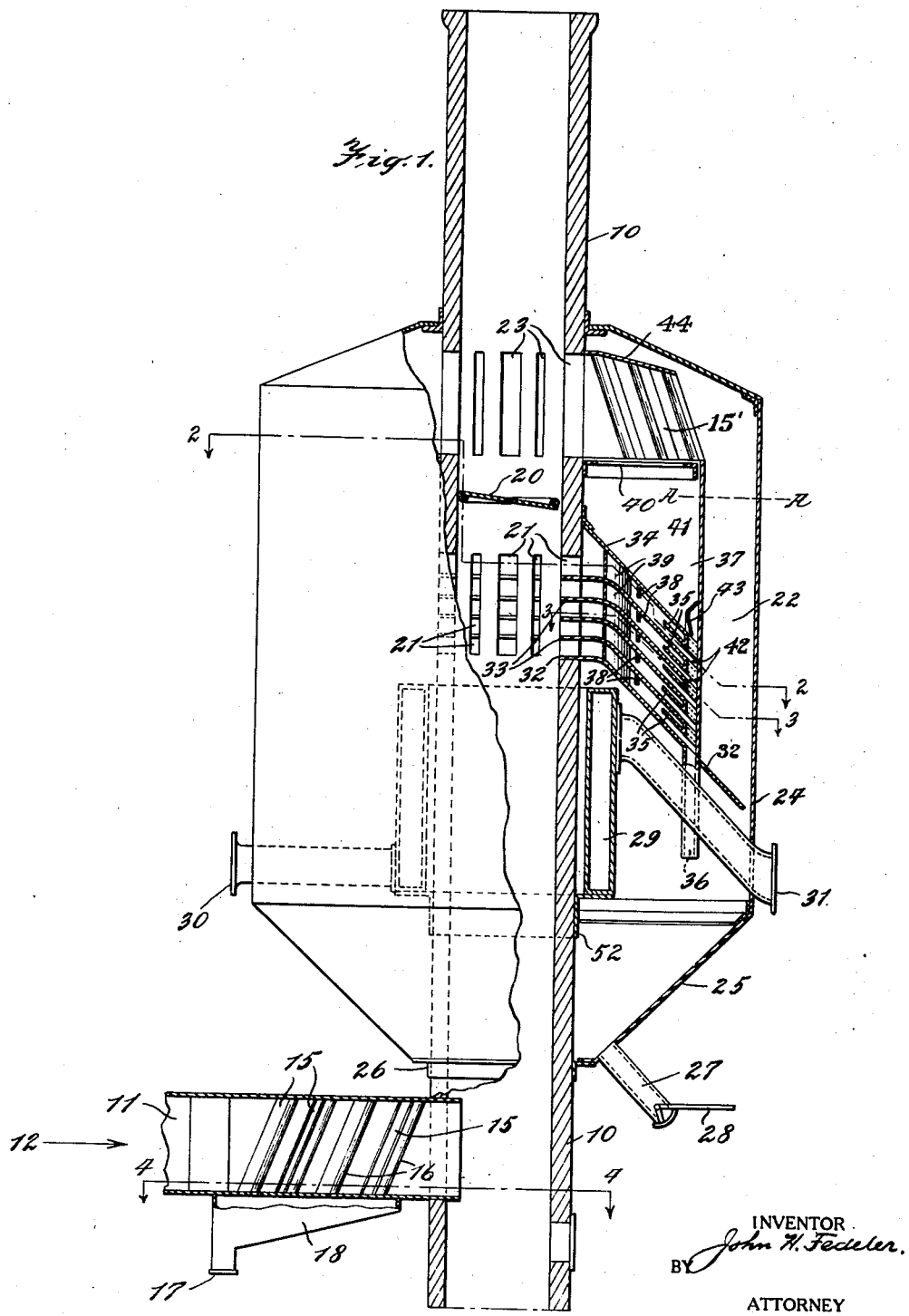
INVENTOR
John H. Fedeler.
BY
ATTORNEY

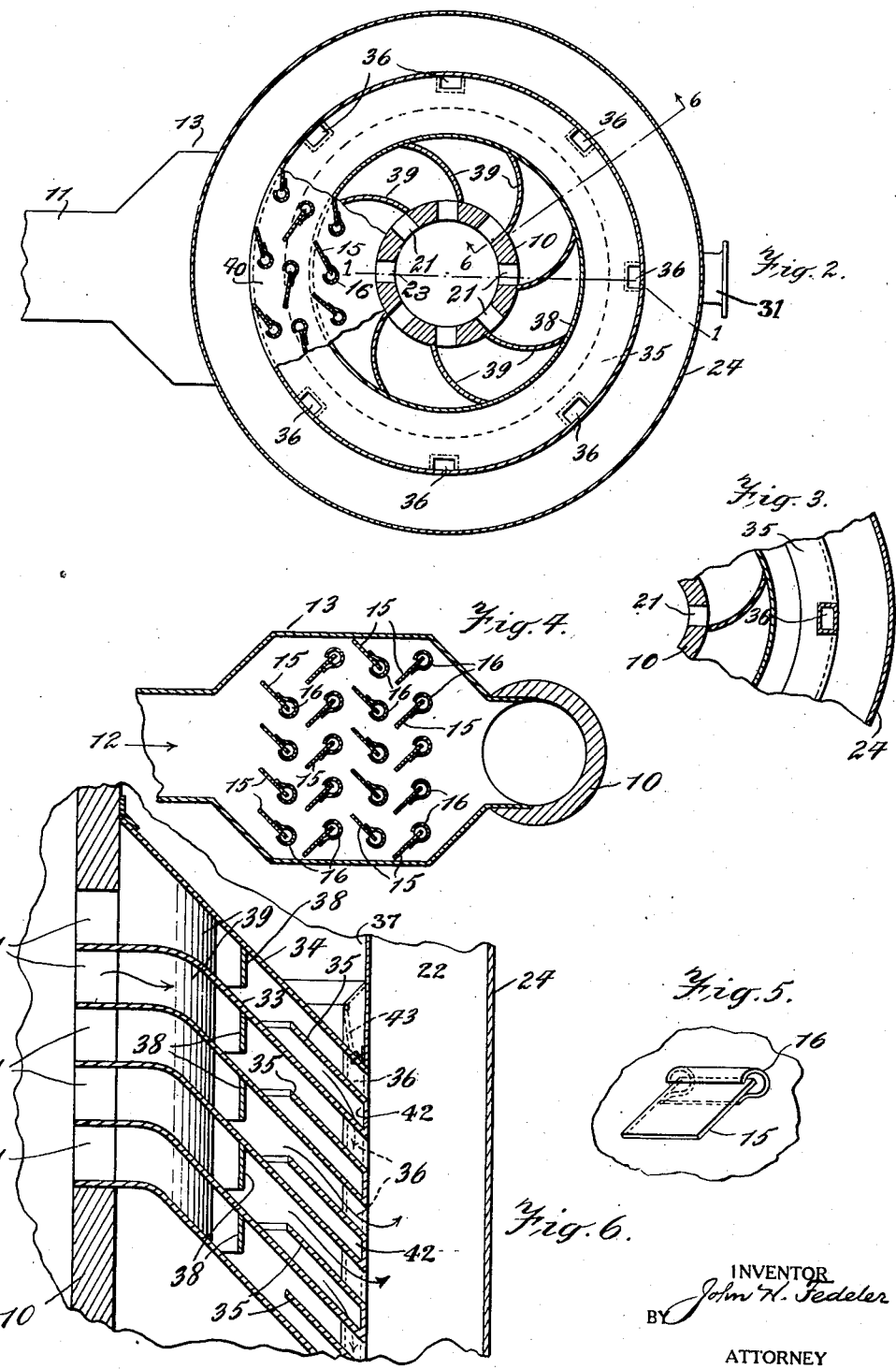

Patented Feb. 28, 1933

1,899,498

UNITED STATES PATENT OFFICE

JOHN H. FEDELER, OF NEW YORK, N. Y.

SEPARATOR

Application filed December 4, 1928. Serial No. 323,677.

This invention relates to a separator primarily designed for use in removing suspended particles or cinders from flue gases.

The object of this invention is to provide a proficient cinder catcher adaptable to chimneys.

A further object is to provide means of cleaning chimney gases without any other power consuming machinery except that which may be used to give a forced draft.

These objects are attained, by separating the gases into horizontal films and introducing novel baffles forming receptacles into which the solids are projected, by reducing the speed of the flue gases due to enlarged space through which they flow, by projecting the gases centrifugally and by cooling the gases with water without wetting the solids and cinders.

These, and other objects of the invention will be more clearly understood from the following detailed description and accompanying drawings in which Figure 1 is a vertical view, and section on the center line through the apparatus, as applied to a chimney on line 1—1 of Fig. 2. Figure 2 is a horizontal section on line 2—2 of Figure 1. Figure 3 shows a fragment on line 3—3 of Figure 1 illustrating a horizontal baffle. Figure 4 is a horizontal section on line 4—4 of Figure 1. Figure 5 illustrates the construction of the vertical baffle. Figure 6 illustrates a fragment section on line 6—6 of Figure 2.

Referring to the above mentioned drawing Fig. 1, 10 is a chimney connected to a furnace (not shown), by a duct 11, and the gases from the furnace flow in the direction of arrow 12 horizontally. Figure 4 illustrates how this horizontal duct 11 is enlarged at 13 to provide room for vertical baffles 15, thereby providing space for the passage of gases without substantially increasing resistance thereto. These baffles are flat plates each of which is provided with a gutter 16 on one edge as shown, and are installed at an angle to the flow of the gases. They arrest solids and turn the flow to one side and permit any cinders or solids to slide along a plate 15 into one of these gutters 16. It must also be observed that these baffles are not perpendicular, but at an angle to the vertical, leaning in the direction of the flow, either from the top or the bottom of the duct, in this illustration the leaning being shown as from the bottom, although it is to be understood that this direction may be reversed within the scope of the invention. When thus the draft ceases, the cinders on a baffle will, by gravity, fall or slide into the gutter. The baffles 15 are staggered so as to change the direction of the flow of gases a number of times. Gutters 16 on the baffles discharge at the bottom into a hole which connects the duct 13 with a collecting receptacle 18, from which the cinders may be drawn and which may be cleaned through spout 17, which is provided with a movable cover, or a valve.

Chimney 10 has a damper 20, which is provided with suitable means for opening and closing the same. On opposite sides of damper 20 are the flue openings 21, leading to stack chamber 22, and the draft openings 23, leading from stack chamber 22 back to chimney 10.

The stack chamber 22 is bounded on its outer side by a housing 24, which may be supported in any suitable way as by the angle 26 secured to the chimney. The chamber 22 terminates at its lower end in a conical receptacle 25, from which cinders may be withdrawn through the spout 27 controlled by the valve 28.

An annular flue 29 with an intake 30 and an outlet 31, is also suitably supported within said housing by angle 52 secured to the chimney. The object of this annular flue is to provide a means for pre-heating air for combustion and to cool the cinders collected in the housing. The cinders, which are the product of combustion, very often hold much more heat than the gases surrounding them and when they are collected in large masses, it becomes necessary to cool them in order to make collection possible, and this cooling is accomplished either as described or by introducing sprays of a sufficient quantity of water to lower the temperature of the cinders, so as to facilitate their precipitation, but not more than the hot gases can absorb, so that there is no moisture left with the cinders, which are easier to remove when dry.

Above the air heating flue 29, and communicating with the openings 21, is a series of annular plates 32, 33, and 34 which form a plurality of passages extending outwardly and downwardly, and which passages serve to separate the gases passing through the openings 21 into a plurality of thin streams or films. Between these plates are depending baffles 38 which deflect the currents downwardly in the passages and thus help to precipitate the cinders or other solid matter in the gases to the bottoms of the passages. Between the plates 32, 33, and 34 are vertically disposed plates 39, best shown in Fig. 2, and which plates cooperate with the plates 32, 33, and 34 to form spirally disposed passages of gradually increasing cross-section. As the gas passes outward and downward, it decreases in velocity on account of the increasing area of the passages. Plates 33 are bent up on their outer periphery and are joined to annular plates 35 to form gutters 42 in which the cinders are precipitated as the gases pass above the gutters out into stack chamber 22, as shown in Fig. 6.

The object of a chimney is primarily to carry the gases away, and, secondly, to create an induced draft by the tendency of the hot gases to rise. During recent years the forcing of boilers and the burning of coal by forced draft has become a practice which make the chimney, for natural draft purposes, useless. With my invention I propose building a housing over a power house similar to the one described, as high as a chimney, to carry off these gases, but it can be as large in diameter, or as extensive as the lot allows, and thus reduce the velocity of the gases, and to assist the precipitation of solids, I direct the flow of the gases downward or horizontally towards the hopper in which the cinders are collected and from which they may be drawn.

In my drawings, I have shown a chimney to illustrate how my separator may be attached to the same, whereas in new construction I would build a stack of sufficient height to carry fumes away, and discharge the cinders as described near the bottom of this stack chamber, or in more obstinate cases, employ the described baffles and plates to pass gases back and forth in a chamber.

55. In some cases, where cinders are heavy, it will only be necessary to build a stack chamber up to demarkation line A—A. The stack chamber thus becomes a large enclosure with ample openings at the top, which may be provided with ventilators, or exhausters to improve the draft.

Plates 32 and 33 may be used for carrying the cinders downward. Fine ash may pass out into the stack chamber 22 which is so large and the flow upward so gradual, that the suspended cinders fall upon plate 32 and slide down into the cone receptacle 25 through the smaller opening between housing 24 and annular plate 32.

The features and means above the demarkation line A—A are necessary when the height of the chimney creates the draft, in which case the stack chamber 22 becomes a closed tank, or where it is necessary to pass gases back and forth.

Annular plates 34 and 40, together with cylindrical plate 37, form an annular container 41 around the chimney. Plate 40, Fig. 1, is disposed beneath baffles 15' similar to the ones heretofore described for duct 11, and is provided with openings through which the cinders caught in the gutters thereon will fall into container 41, which is provided with a number of chutes 36, through which the cinders pass down into cone receptacle 25. Each chute 36 is open inside of each gutter 42, so that the cinders collected in these gutters can flow down the same way as illustrated in Figs. 1 and 6. Chutes 36 are otherwise enclosed and may be provided with light swinging check flaps 43 at their tops to prevent the gases from rising in these chutes.

Baffles 15', with gutters similar to those shown at 16 in Fig. 4, mounted on annular plate 40, in staggered formation, change the direction of the flow of gases to assist the precipitation of the cinders in the gutters. The tops of these baffles are supported by annular plate 44.

In starting a fire, damper 20 should be open, and then should be closed after the chimney is warmed up. The gases will then pass through openings 21, up through the stack chamber 22 and back through openings 23 into the stack.

Having thus described my invention, what I claim as new and desire to cover by Letters Patent is:

1. In a separator for dust-laden gases, a stack provided with a damper, a bypass for the gases around said damper and comprising a chamber and a passage, said passage extending outwardly from said stack at a point beneath said damper and communicating with said chamber, said passage being constructed and arranged to impart a centrifugal movement to the gases as they pass therethrough, whereby solid particles are separated from said gases.

2. In a separator for dust-laden gases, a stack provided with a damper, a bypass for the gases around said damper and comprising a chamber and a passage, said passage extending outwardly from said stack at a point beneath said damper and communicating with said chamber, said passage being constructed and arranged to impart a centrifugal movement to the gases as they pass therethrough, whereby solid particles are separated from said gases, and means for removing the separated dust from the separator.

3. In a separator for dust-laden gases, a stack provided with a damper, a by-pass for the gases around said damper and comprising a chamber and a passage leading from the stack to the chamber beneath the damper, said passage being of spiral form for imparting a centrifugal movement to the gases, whereby solid particles may be separated from said gases.

4. In a separator for dust-laden gases, a stack provided with a damper, a bypass for the gases around said damper and comprising a chamber and a passage communicating with said stack beneath said damper and extending outwardly to said chamber, said passage being inclined downwardly from the stack to the chamber and provided with gutters to receive dust, said passage being constructed and arranged to impart a centrifugal movement to the gases passing therethrough, whereby solid particles may be separated from the gases and received in said gutters, and means for removing the dust from said gutters.

5. In a separator for dust-laden gases, a stack provided with a damper, a chamber spaced from said stack adjacent said damper, means forming a passage extending from said stack beneath said damper to said chamber and constructed and arranged to impart a centrifugal movement to the gases passing therethrough, whereby solid particles are separated from said gases, means providing passages from the upper end of said chamber to the stack above said damper, and other dust separating means located in said last-named passages.

6. In a separator for dust-laden gases, a stack provided with a damper, a chamber spaced from said stack adjacent said damper, means forming a passage extending from said stack beneath said damper to said chamber and constructed and arranged to impart a centrifugal movement to the gases passing therethrough, whereby solid particles are separated from said gases, an annular dust receiver surrounding said stack beneath said chamber, means for discharging dust from said passage and from said chamber into said receiver, means for removing dust therefrom, and means forming a passage from the upper portion of said chamber to the stack above said damper.

Signed at New York, in the county and State of New York this 1st day of December A. D. 1928.

JOHN H. FEDELER.